United States Patent [19]

Katz et al.

[11] Patent Number: 5,385,747

[45] Date of Patent: Jan. 31, 1995

US005385747A

[54] PROCESS FOR MAKING A FRUIT GEL COMPOSITION IN SQUEEZE CONTAINER

[75] Inventors: Sumner N. Katz, Norwood Park Township, Cook County; Thomas L. O'Connor, Chicago, both of Ill.

[73] Assignee: Mama Tish's Italian Specialties, Inc., Chicago, Ill.

[21] Appl. No.: 918,234

[22] Filed: Jul. 23, 1992

[51] Int. Cl.$^6$ ............... A23L 1/0526; A23L 1/0528; A23L 1/0532; A23L 1/068

[52] U.S. Cl. ....................... 426/573; 426/115; 426/394; 426/410

[58] Field of Search ............. 426/573, 115, 394, 410

[56] References Cited

U.S. PATENT DOCUMENTS

| | | |
|---|---|---|
| 2,541,731 | 2/1949 | Walker . |
| 2,803,548 | 8/1957 | Hagerty . |
| 3,615,718 | 10/1971 | Weinstein . |
| 3,658,556 | 4/1972 | Klein . |
| 3,804,951 | 4/1974 | Rapp . |
| 3,962,482 | 6/1976 | Comer et al. . |
| 4,051,267 | 9/1977 | Jongeling . |
| 4,197,325 | 4/1980 | Ono et al. . |
| 4,205,093 | 5/1980 | Blake . |
| 4,282,262 | 8/1981 | Blake . |
| 4,297,379 | 10/1981 | Topalian et al. . |
| 4,312,891 | 1/1982 | Eisfeldt . |
| 4,341,810 | 7/1982 | Shank . |
| 4,427,704 | 1/1984 | Cheney et al. . |
| 4,444,799 | 4/1984 | Vanderveer et al. . |
| 4,526,790 | 7/1985 | Samala ................. 426/115 |
| 4,542,035 | 9/1985 | Huang et al. . |
| 4,569,838 | 2/1986 | de Vries ................. 424/49 |
| 4,582,712 | 4/1986 | Gonsalves et al. . |
| 4,650,683 | 3/1987 | Guittard et al. . |
| 4,752,489 | 6/1988 | Wallace et al. . |
| 4,847,098 | 7/1989 | Langler . |
| 4,853,236 | 8/1989 | Langler . |
| 4,943,444 | 7/1990 | Nozaki et al. . |
| 4,952,413 | 8/1990 | LaBarge et al. . |
| 4,957,764 | 9/1990 | Okonogi et al. .............. 426/573 |
| 5,013,321 | 5/1991 | MacVane .................. 426/115 |
| 5,063,073 | 11/1991 | Kratochvil . |
| 5,089,285 | 2/1992 | Nozaki et al. . |
| 5,098,728 | 3/1992 | Singer et al. . |

OTHER PUBLICATIONS

FMC Application Bulletin, No. B-58, Dated 1990.
FMC Bulletin No. 420, Dated 1992.
FMC Product Information Bulletin, No. 510, Dated 1988.
FMC Quick Reference Guide A-2, Dated 1989.
FMC Introductory Bulletin A-1, Dated 1991.
Photocopy of squeeze container for Mama Tish's Gourmet Italian Ices.
Marine Colloids Product Information Bulletin No. 621 for Gelcarin 425B.
Marine Colloids Product Information Bulletin No. 510 for Gelcarin 654B.
Photograph of cover of "Jelly Cup" gelled dessert product with listing of ingredients from package.

*Primary Examiner*—Donald E. Czaja
*Assistant Examiner*—Mary S. Mims
*Attorney, Agent, or Firm*—Emrich & Dithmar

[57] ABSTRACT

A packaged food product includes a flexible container filled with an edible gel composition having a firmness and elasticity such that when the container is squeezed the composition is extruded through the discharge opening therein and retains its extruded shape. The composition includes a gel medium comprising water, carrageenan, locust bean gum and a potentiator for the carrageenan, in which is uniformly dispersed and suspended a flavoring system including fruit pieces or fruit juice, a sweetening agent, a food grade acid and xanthan gum. A vitamin and a flavorant may be included in the flavoring system and preservatives and a buffering agent may be included in the gel system. In forming the composition, the gel and flavorant systems are separately mixed and heated for sterilizing the flavoring system and activating the gel system, the two systems are then combined after having being cooled to temperatures such that the gel system stays above the gel point temperature and the combined composition will be only slightly above the gel point temperature. The composition is then cooled below the gel point temperature.

8 Claims, No Drawings

PROCESS FOR MAKING A FRUIT GEL COMPOSITION IN SQUEEZE CONTAINER

BACKGROUND OF THE INVENTION

1. Field of the Invention

The present invention relates to food products and, more particularly, to edible gel dessert compositions and to methods of preparation thereof and packaging therefor.

2. Description of the Prior Art

A number of different gel dessert compositions have heretofore been provided, including compositions having fruit particles or pieces distributed in the gel. Such products have customarily been provided in closed containers, such as cans, lidded plastic containers and the like. Such products are "ready to eat" in the sense that they require no cooking or other preparation by the consumer, but they have the disadvantage that they cannot be conveniently eaten without the use of a utensil, such as a spoon or the like. Furthermore, in the preparation and packaging of such gel dessert compositions, the compositions are either added to the container at a sterilizing temperature or are heated to a sterilizing temperature while in the container, requiring the use of container materials which can withstand sterilizing temperatures. Also, many such gel dessert compositions must be maintained refrigerated until used in order to prevent degradation of the gel and, even while refrigerated, many such products are subject to syneresis.

It is also known to provide dessert products, such flavored ices and the like, in squeeze tube or sleeve containers, such that the product can be extruded from the container by squeezing it so that the product can be eaten without the use of a utensil. However, such products are intended to be eaten frozen and, therefore, must be kept frozen until used.

SUMMARY OF THE INVENTION

It is a general object of the present invention to provide an improved gel dessert product which avoids the disadvantages of prior products which affording additional advantages.

An important feature of the invention is the provision of a gel dessert product which can be eaten without the use of a utensil.

In connection with the foregoing feature, another feature of the invention is the provision of an edible gel composition which is extrudable from a squeeze container and will retain its extruded shape.

In connection with the foregoing features, yet another feature of the invention is the provision of a gel composition of the type set forth in which the gel medium does not degrade at room temperature.

Still another feature of the invention is the provision of a packaged food product including a flexible squeeze container filled with a composition of the type set forth.

Yet another feature of the invention is the provision of a composition of the type set forth which has fruit pieces substantially uniformly distributed and suspended therein.

A still further feature of the invention is the provision of a process for making a composition of the type set forth.

These and other features of the invention are attained by providing an edible gel composition which is extrudable and retains its extruded shape, the composition comprising: a fruit material substantially uniformly dispersed in a gelatinous medium, the medium including xanthan gum and carrageenan and a source of ions of a metal to which the carrageenan is sensitive, the source of ions being present in an amount sufficient to impart to the composition a firmness such that it will be extrudable and will retain its extruded shape.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

The present invention is a fruit gel composition which is packaged in a flexible container, the composition having a strength, firmness and elasticity such that it can be extruded from the container by squeezing the container, and will retain its extruded shape. The product is shelf-stable without refrigeration, i.e., it will not physically degrade, such as by syneresis, at room temperature.

The composition includes fruit material such as fruit juice or fruit pieces substantially uniformly dispersed and suspended in a gelatinous medium. More specifically, the composition includes water and gelling agents including carrageenan, locust bean gum and xanthan gum and an activator or potentiator for the carrageenan, which is a source of ions of a metal to which the carrageenan is sensitive. Preferably, the carrageenan includes a blend of kappa or potassium-sensitive carrageenan and iota or calcium-sensitive carrageenan and suitable potentiators therefor. In the preferred embodiment the gelling agents may include commercially available blends of gelling agents, such as those sold by the Marine Colloids Division of FMC Corporation under the trade names Gelcarin 654B and Gelcarin 425B. Gelcarin 654B includes carrageenan, clarified locust bean gum and tripotassium citrate as a potentiator. Gelcarin 425 includes carrageenan, locust bean gum, dextrose and potentiators including disodium phosphate, potassium citrate and calcium sulfate. While potentiators are included in the Gelcarin 654B and 425B products, it is an aspect of the invention that an additional source of potassium ions, such as potassium citrate, as a potentiator is utilized to give the gel medium the desired firmness and elasticity so that the composition will be extrudable and will hold its extruded shape.

Since the fruit material may not provide adequate flavor, the composition also includes, in addition to the fruit material, a natural or artificial flavorant, along with a sweetening agent and a food grade acid to provide tartness. If desired, a nutritive vitamin or the like, as well as a colorant and preservative agents may be included.

It is a significant aspect of the invention that the composition includes xanthan gum which serves as a thickening agent to facilitate suspension of fruit pieces in the gelatinous medium so as to prevent separation of ingredients with different densities. The xanthan gum also serves to minimize syneresis, i.e., it serves to prevent separation of water from the finished composition. Additionally, the xanthan gum functions as a gelling agent in that it improves the characteristics of the gelatinous medium. While xanthan gum, by itself, will not gel, when combined with the locust bean gum in the Gelcarin products it has a synergistic effect to improve the characteristics of the gel composition.

Formulations which provide the foregoing effects and which have been found to produce excellent results are set forth in the following examples:

EXAMPLE I

Gelled Strawberry Fruit Product

| Ingredient | Function | Amount in % by Weight |
|---|---|---|
| Water | Suspension Medium, Solvent | 77.824 |
| Sucrose | Sweetener | 10.461 |
| Strawberries | Fruit | 5.000 |
| High fructose corn syrup (HFCS) | Sweetener | 4.911 |
| Gelcarin 425B | Gelling agent | 0.438 |
| Gelcarin 654B | Gelling agent | 0.438 |
| Malic acid | Acidulent, preservative | 0.319 |
| Strawberry flavor | Flavorant | 0.226 |
| Ascorbic acid | Vitamin | 0.127 |
| Xanthan gum | Thickener, suspending agent, anti-syneresis agent, gelling agent | 0.103 |
| Potassium citrate | Potentiator, buffering agent | 0.099 |
| Sodium benzoate | Preservative | 0.024 |
| Potassium sorbate | Preservative | 0.024 |
| FD&C Red #40 | Colorant | 0.008 |

The potassium sorbate decreases the potential for molding. Sodium benzoate and potassium sorbate decrease the growth of yeast. The potassium citrate serves as a source of potassium ions to act as a potentiator for the carrageenans in the Gelcarin products and also serves as a buffer to minimize the effect of acid on the gel. Disodium phosphate and/or calcium sulfate could be used in conjunction with the potassium citrate as potentiators for the carrageenans in the Gelcarin products. Also, potassium benzoate could be substituted for the potassium citrate as a potentiator, but would not have the same acid buffering effect. Other vitamins could be substituted for ascorbic acid for desired nutritive effects. The malic acid is a food grade acid which, in addition to serving as a flavor enhancer, also has a preservative effect.

EXAMPLE II

Gelled Cherry Fruit Product

This composition is similar to Example I, except that cherries are substituted for strawberries and cherry flavor is substituted for strawberry flavor. The cherry flavor is present in an amount of 0.045% by weight, and, accordingly, the percentages by weight of water and red colorant are adjusted to 78.000 and 0.011, respectively.

EXAMPLE III

Gelled Grape Fruit Product

This composition is similar to Example I, except that grape juice from concentrate is substituted for strawberries, purple colorant (a blend of red cabbage extract and Blue #1) is substituted for the red colorant, and grape flavor is substituted for the strawberry flavor. The grape flavor is present in an amount of 0.078% by weight, while the purple colorant is 0.047% by weight. Accordingly, the percentages by weight of certain other ingredients are adjusted as follows: water - 78.548, sucrose - 10,007, HFCS - 4,700, ascorbic acid-0.226 and xanthan gum - 0.052. In this example the xanthan gum is not needed as a suspending agent, but it does still serve as a gelling agent and as an anti-syneresis agent.

The carrageenans in the Gelcarin products tend to degrade in the presence of acid at a high temperature. Accordingly, it is a fundamental aspect of the invention that, in forming the fruit gel composition, the ingredients are separated into two systems, with the acid in one system and the Gelcarin products in the other system, so as to minimize the exposure of the carrageenans to acid at a high temperature before the gel has set.

System A includes the fruit or fruit juice, sugar, corn syrup, acids and colorant which are added to a vessel. System A also includes the xanthan gum, which is separately blended with hot water in a blender to disperse it in the water and then it is added to the other ingredients of system A in the vessel. System A is then mixed until it becomes homogeneous and is cooked at a sterilization temperature of at least 185° F., and preferably between 185° and 240° F., minutes and it is then cooled to 160° F. This cooking may be accomplished in an open vessel, or may be done aseptically in a closed system. In the latter case the flavorant, which is also a part of system A, can be added to the vessel along with the other ingredients in system A. In the case of open-vessel cooking, however, the flavorant is not added until after the system has been cooled to 160°, otherwise its flavoring value will diminish.

System B includes the sodium benzoate, potassium citrate, potassium sorbate, and the Gelcarin products, which are all in powdered form, and are pre-blended in water and heated to a temperature of approximately 185°–190° F. while being agitated, at which temperature the gelling agents become hydrated. Heating is continued until the system is solubilized, as determined visually in an open vessel system. Under aseptic manufacture, this heating will be done in a closed tank. The system B is then cooled to a temperature slightly above the gel point temperature of the system, which is approximately 115° F.

Preferably both systems A and B, after heating, are cooled to approximately the same temperature, which is slightly above the gel point temperature, and are then combined and mixed together to uniformly distribute the fruit pieces in the gel medium. However, it is not essential that both systems A and B be at the same temperature, as long as neither system B nor the composition resulting from the combination of systems A and B falls below the gel point temperature. Thus, for example, at the time of combination, system B could be at 140° F. and system A at 100° F. Preferably the temperatures of systems A and B at combination are selected so that the combined composition has a temperature which exceeds the gel point temperature by only a slight amount, preferably no more than about 10° F. This will ensure that the composition can be cooled to the gel point temperature to set the gel very rapidly, thereby minimizing the degrading effect of the acid on the gelling agents, and also obviating other mechanical cooling stages.

Just before the composition has set, it is used to fill a flexible container through an opening therein, which is then covered with a suitable cap. The container may be in the nature of a flexible, open-top tube, cone or the like, and may be formed of any suitable water-impermeable material, such as plastic, coated paper or the like. It is a significant aspect of the invention that, when the cap or cover is removed, the container can be manually squeezed to extrude the fruit gel composition through the opening, the composition being such that it will retain its extruded shape and will not collapse, fold over, spill or melt. The extruded portion of the composition can then be eaten without the use of a utensil, the composition having a consistency such that it is chewable.

Another significant aspect of the invention is that the packaged fruit gel product is designed to maintain its physical stability over a substantial time period up to four to six months without refrigeration. However, if desired, the product may be refrigerated to minimize the chance of spoilage and/or because of consumer preference for a chilled product.

From the foregoing, it can be seen that there has been provided an improved packaged fruit gel product which includes a fruit gel composition which can be extruded from a squeeze container while retaining its extruded shape, and which has good shelf-life stability without refrigeration.

We claim:

1. A process for preparing an edible gel composition comprising the steps of: mixing together a fruit material and a sweetener and at least one food grade acid in an amount sufficient to impart a tart taste simulating that of fresh fruit to provide a first system, heating the first system to a sterilizing temperature for sufficient time to effect sterilization, combining in water a powdered food gelling agent including carrageenan and a source of ions of a metal to which the carrageenan is sensitive to provide a second system, agitating the second system independently of the first system while heating it to a temperature in the range from about 185° F. to about 190° F. for a time sufficient to solubilize the second system, cooling the first and second systems respectively to first and second predetermined temperatures wherein the second temperature is at least the gel point temperature of the second system and then combining the first and second systems to form said composition, said first predetermined temperature being such that the temperature of the combined composition will be no greater than about 10° F. above the gel point temperature of the second system, and cooling the composition to below the gel point temperature of the second system.

2. The process of claim 1, and further comprising mixing a sweetening agent in said first system.

3. The process of claim 1, wherein said food grade acid includes malic acid.

4. The process of claim 1, and further comprising the step of providing xanthan gum in said first system.

5. The process of claim 4, and further comprising the step of blending the xanthan gum with hot water prior to mixing it together with the other ingredients of the first system.

6. The process of claim 5, and further comprising the steps of cooling the heated first system to a temperature of about 160° F., and then adding a flavorant thereto.

7. The process of claim 1, and further comprising the step of mixing a flavorant in the first system prior to heating thereof, said step of heating the first system being carried out in a closed aseptic environment.

8. The process of claim 1, and further comprising the step adding a preservative agent to the second system prior to the heating thereof.

* * * * *